(12) United States Patent
Lo

(10) Patent No.: US 9,903,748 B1
(45) Date of Patent: Feb. 27, 2018

(54) LIQUID LEVEL SENSOR AND METHOD FOR SENSING LIQUID LEVEL

(71) Applicant: Chih-Hsuan Lo, Hsinchu (TW)

(72) Inventor: Chih-Hsuan Lo, Hsinchu (TW)

(73) Assignee: ITE Tech. Inc., Hsinchu (TW)

( * ) Notice: Subject to any disclaimer, the term of this patent is extended or adjusted under 35 U.S.C. 154(b) by 0 days.

(21) Appl. No.: 15/296,040

(22) Filed: Oct. 18, 2016

(30) Foreign Application Priority Data

Aug. 25, 2016 (TW) .............................. 105127205 A

(51) Int. Cl.
*G01F 23/26* (2006.01)
(52) U.S. Cl.
CPC .......... *G01F 23/266* (2013.01); *G01F 23/268* (2013.01)
(58) Field of Classification Search
CPC .............................. G01F 23/266; G01F 23/268
USPC .................................... 73/304 C, 304 R, 290
See application file for complete search history.

(56) References Cited

U.S. PATENT DOCUMENTS

| 7,219,545 B2 * | 5/2007 | Salzmann ............. G01F 23/243 73/290 R |
| 9,395,716 B2 * | 7/2016 | Bammer .............. A61M 5/1684 |
| 9,429,461 B2 * | 8/2016 | Gebhardt .............. G01F 23/266 |

FOREIGN PATENT DOCUMENTS

| TW | M359687 | 6/2009 |
| TW | 201314184 | 4/2013 |
| TW | M506734 | 8/2015 |
| TW | M515098 | 1/2016 |

OTHER PUBLICATIONS

"Office Action of Taiwan Counterpart Application," dated Jun. 27, 2017, p. 1-p. 7.

* cited by examiner

*Primary Examiner* — Jewel V Dowtin
(74) *Attorney, Agent, or Firm* — JCIPRNET

(57) ABSTRACT

A liquid level sensor and a method for sensing a liquid level adapted to a liquid storage container are provided. The liquid level sensor includes a plurality of sensing electrodes and a liquid level determining circuit. The sensing electrodes are arranged on a side wall of the liquid storage container, and correspond to different liquid levels. The liquid level determining circuit is coupled to the sensing electrodes, and scans capacitance values of the sensing electrodes, so as to determine a liquid level of a liquid in the liquid storage container based on the current capacitance values of the sensing electrodes.

8 Claims, 1 Drawing Sheet

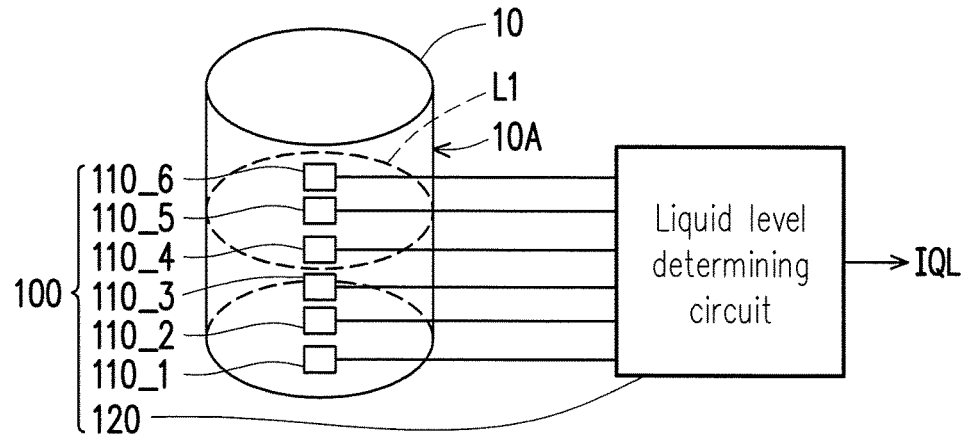

FIG. 1

```
┌─────────────────────────────────────────────────────┐
│ Providing and arranging a plurality of sensing      │
│ electrodes on a side wall of a liquid storage       │─S210
│ container, wherein the sensing electrodes           │
│ correspond to different liquid levels               │
└─────────────────────────────────────────────────────┘
                          ↓
┌─────────────────────────────────────────────────────┐
│ Scanning capacitance values of the sensing          │─S220
│ electrodes by a liquid level determining circuit    │
└─────────────────────────────────────────────────────┘
                          ↓
┌─────────────────────────────────────────────────────┐
│ Determining a liquid level of a liquid in the       │
│ liquid storage container based on the current       │─S230
│ capacitance values of the sensing electrodes        │
└─────────────────────────────────────────────────────┘
```

LIQUID LEVEL SENSOR AND METHOD FOR SENSING LIQUID LEVEL

CROSS-REFERENCE TO RELATED APPLICATION

This application claims the priority benefit of Taiwan application serial no. 105127205, filed on Aug. 25, 2016. The entirety of the above-mentioned patent application is hereby incorporated by reference herein and made a part of this specification.

BACKGROUND

Field of the Invention

The invention relates to a sensor and more particularly, to a liquid level sensor and a method for sensing a liquid level.

Description of Related Art

In a home appliance, if a liquid level display function is needed (for example, in a washing machine, a water dispenser, a pumping motor, or the like), a floating ball or a glass tube marked with a scale is usually used to achieve displaying an internal water level. When a liquid level is measured by using the aforementioned structure in the home appliance, the volume of the structure can be shrunk in a limited degree, and as a result, the overall volume cannot be lighter and thiner. Therefore, how to make the liquid level measurement apparatus lighter and thinner has become a subject to modern home appliances.

SUMMARY

The invention provides a liquid level sensor with a small-volume measurement structure for achieving a light and thin liquid level sensor and a method for sensing a liquid level.

A liquid level sensor of the invention is adapted to a liquid storage container and includes a plurality of sensing electrodes and a liquid level determining circuit. The sensing electrodes are arranged on a side wall of the liquid storage container, and correspond to different liquid levels. The liquid level determining circuit is coupled to the sensing electrodes, and scans capacitance values of the sensing electrodes, so as to determine a liquid level of a liquid in the liquid storage container based on the current capacitance values of the sensing electrodes.

A method for sensing a liquid level of the invention includes the following steps. A plurality of sensing electrodes are provided and arranged on a side wall of a liquid storage container, wherein the sensing electrodes correspond to different liquid levels. Capacitance values of the sensing electrodes are scanned by a liquid level determining circuit. A liquid level of a liquid in the liquid storage container is determined based on the current capacitance values of the sensing electrodes.

To sum up, in the liquid level sensor and the method for sensing the liquid level provided by the embodiments of the invention, a liquid level of a liquid is sensed by the sensing electrodes, and thus, the liquid level of the liquid can still be determined even when less space is occupied by the liquid.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic system diagram showing a liquid level sensor according to an embodiment of the invention.

FIG. 2 is a flowchart of a method for sensing a liquid level according to an embodiment of the present invention.

DESCRIPTION OF EMBODIMENTS

FIG. 1 is a schematic system diagram showing a liquid level sensor according to an embodiment of the invention. Referring to FIG. 1, in the present embodiment, a liquid level sensor 100 is adapted to a liquid storage container 10 and includes a plurality of sensing electrodes 110_1 to 110_6 and a liquid level determining circuit 120. The sensing electrodes 110_1 to 110_6 are arranged on a side wall 10A of the liquid storage container 10, and correspond to different liquid levels. The sensing electrodes 110_1 to 110_6 are disposed on an inner surface or an outer surface of the side wall 10A, which depends on the circuit design. Referring to the illustration, the liquid levels correspond to the sensing electrodes 110_1 to 110_6 from low to high levels, for example, and a resolution of each liquid level determined based on the number and patterns of the sensing electrodes 110_1 to 110_6. In this case, the number and the patterns of the sensing electrodes 110 _ 1 to 110_6 are illustrated as an example for illustration.

The liquid level determining circuit 120 is coupled to the sensing electrodes 110_1 to 110_6 and scans capacitance values of the sensing electrodes 110_1 to 110_6, so as to determine a liquid level (as presented by L1) of a liquid in the liquid storage container 10 based on the current capacitance values of the sensing electrodes 110_1 to 110_6, and provide liquid level information IQL based on the liquid level (as presented by L1) of the liquid.

Furthermore, as being operated in the same way as a capacitive touch module, the liquid in the liquid storage container 10 influences the capacitance value of each of the sensing electrodes 110_1 to 110_6. When the liquid level (as presented by L1) of the liquid rises and contacts each of the sensing electrodes 110_1 to 110_6, the capacitance value of each of the sensing electrodes 110_1 to 110_6 rises in correspondence to a submerged ratio. When the capacitance value of each of the sensing electrodes 110_1 to 110_6 rises for a certain degree, it indicates that the liquid level (as presented by L1) of the liquid is greater than or equal to the liquid level corresponding to each of the sensing electrodes 110_1 to 110_6.

In other words, the liquid level determining circuit 120 stores a plurality of base capacitance values and a plurality of capacitance thresholds, and each of the sensing electrodes 110_1 to 110_6 corresponds to a base capacitance value and a capacitance threshold. Namely, each of the sensing electrodes 110_1 to 110_6 has an initiate capacitance value. Then, the liquid level determining circuit 120 calculates capacitance variation values of the sensing electrodes 110_1 to 110_6 based on the current capacitance values and the base capacitance values of the sensing electrodes 110_1 to 110_6. When the capacitance variation value of each of the sensing electrodes sensing electrodes 110_1 to 110_6 is greater than or equal to its corresponding capacitance threshold, it indicates that the liquid level (as presented by L1) of the liquid is greater than or equal to the liquid level corresponding to each of the sensing electrodes 110_1 to 110_6.

In comparison with a capacitance sensing method of the related art, for adapting to change of environment, the base capacitance values of the sensing electrodes (e.g., 110_1 to 110_6) are calibrated altogether when touched points are scanned in the conventional capacitance sensing method. However, in case the base capacitance values of the sensing electrodes are calibrated at any time, the liquid level determining circuit 120 may be incapable of determining the liquid level (as presented by L1) of the liquid.

In the present embodiment, for avoiding the issue caused by the base capacitance values of the sensing electrodes which are calibrated at any time, the base capacitance values of the liquid level determining circuit 120 are set during a factory calibration and lockup after the setting is completed. Namely, the base capacitance values cannot be changed by a user, nor be calibrated again outside the factory. In other words, the operation manner of the liquid level determining circuit 120 is actually different from that of the conventional capacitive touch module. In this way, when being powered on in a condition that there is a liquid in the liquid storage container 10, and the liquid is then injected into the liquid storage container 10, the liquid level sensor 100 is capable of normally sensing a liquid level of the liquid. Alternatively, when being powered on in a condition that there is a liquid in the liquid storage container 10, the liquid level sensor 100 is capable of determining the current liquid level of the liquid and continues the normal operation.

Specifically, the calibration operation of the liquid level sensor 100 pertains to the calibration and setting operations performed on the liquid level sensor 100 in the factory before being manufactured and shipped. The calibration operation include the following steps. After the liquid level sensor 100 is assembled, a command is issued to the liquid level sensor 100 through a work station to perform an environment calibration (field clearing) before it is manufactured and shipped. Then, the current environment parameter settings are recorded. Finally, the environment parameter settings are refilled in the liquid level determining circuit 120 of the liquid level sensor 100. As the assembly of each liquid level sensor 100 varies, the aforementioned environment parameter settings pertain to environment variable difference of each liquid level sensor 100. After the environment calibration is completed, the liquid level corresponding to each of the sensing electrodes 110_1 to 110_6 in the liquid level sensor 100 may be set through a tool software. Therein, the calibration operation is only performed on the liquid level sensor 100 in the factory end, instead of being performed in a normal operation environment.

In the embodiments of the invention, the liquid level determining circuit 120 may continue to compare the capacitance variation values of all the sensing electrodes 110_1 to 110_6 with the corresponding capacitance thresholds. Alternatively, the liquid level determining circuit 120 may stop the scanning operation after the operation of comparing the capacitance variation values of all the sensing electrodes 110_1 to 110_6 with the corresponding capacitance thresholds is completed during a scan period. Alternatively, during a scan period, the liquid level determining circuit 120 may compare the capacitance variation values of the sensing electrodes 110_1 to 110_6 with the corresponding capacitance thresholds from low to high liquid levels, and when one of the capacitance variation values of the sensing electrodes 110_1 to 110_6 is less than the corresponding capacitance threshold, the liquid level determining circuit 120 may stop the scanning operation. Alternatively, during a scan period, the liquid level determining circuit 120 may compare the capacitance variation values of the sensing electrodes 110_1 to 110_6 with the corresponding capacitance thresholds from high to low liquid levels, and when one of the capacitance variation values of the sensing electrodes 110_1 to 110_6 is greater than or equal to the corresponding capacitance threshold, the liquid level determining circuit 120 may stop the scanning operation. The scan periods may be sequentially adjacent or not, which depends on the circuit design, and the embodiments of the invention are not limited thereto.

Based on the above, the liquid level of the liquid is sensed by the sensing electrodes 110_1 to 110_6. Namely, the liquid level of the liquid can still be determined even when less space is occupied by the liquid level sensor 100, and the sensed information is fed back for being analyzed to cope with related program setting operations. Meanwhile, all related functions may be integrated in one chip to completely replace the conventional liquid level sensing method, and prevent the issues caused by applying the capacitive sensing method to the sensing of the liquid level, so as to satisfy sensing demands for a variety of liquid levels.

FIG. 2 is a flowchart of a method for sensing a liquid level according to an embodiment of the present invention. Referring to FIG. 2, in the present embodiment, a method for sensing a liquid level includes the following steps. In step S210, a plurality of sensing electrodes are provided and arranged on a side wall of a liquid storage container. The sensing electrodes correspond to different liquid levels. In step S220, capacitance values of the sensing electrodes are scanned by a liquid level determining circuit. In step S230, a liquid level of a liquid in the liquid storage container is determined based on the current capacitance values of the sensing electrodes. Therein, the sequence of steps S210, S220 and S230 are for the purpose of illustration, but the embodiments of the invention are not limited thereto. In the meantime, details of steps S210, S220 and S230 may refer to the description with respect to the embodiment illustrated in FIG. 1 and will not repeated hereinafter.

Based on the above, in the liquid level sensor and the method for sensing the liquid level provided by the embodiments of the invention, the liquid level of the liquid is sensed by the sensing electrodes. Thus, the liquid level of the liquid can still be determined even when less space is occupied by the liquid level sensor, and the base capacitance values of the liquid level determining circuit are lockup after the factory setting, such that the issues caused by applying the capacitive sensing method to the sensing of the liquid level can be prevented.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:

1. A liquid level sensor, adapted to a liquid storage container, comprising:
   a plurality of sensing electrodes, arranged on a side wall of the liquid storage container, and corresponding to different liquid levels; and
   a liquid level determining circuit, coupled to the sensing electrodes, and scanning capacitance values of the sensing electrodes, so as to determine a liquid level of a liquid in the liquid storage container based on the current capacitance values of the sensing electrodes, wherein the liquid level determining circuit stores a plurality of base capacitance values and a plurality of capacitance thresholds corresponding to the sensing electrodes, and calculates capacitance variation values of the sensing electrodes based on the current capacitance values and the base capacitance values, and when the capacitance variation value of each of the sensing electrodes is greater than the corresponding one of the capacitance thresholds, it indicates that the liquid level of the liquid is greater than or equal to the liquid level corresponding to each of the sensing electrodes, wherein the base capacitance values are lockup after a factory calibration is performed.

2. The liquid level sensor according to claim 1, wherein the liquid level determining circuit compares the capacitance variation values of the sensing electrodes with the corresponding capacitance thresholds during a scan period.

3. The liquid level sensor according to claim 2, wherein the liquid level determining circuit compares the capacitance variation values of the sensing electrodes with the corresponding capacitance thresholds from low to high liquid levels during the scan period.

4. The liquid level sensor according to claim 2, wherein the liquid level determining circuit compares the capacitance variation values of the sensing electrodes with the corresponding capacitance thresholds from high to low liquid levels during the scan period.

5. A method for sensing a liquid level, comprising:
providing and arranging a plurality of sensing electrodes on a side wall of a liquid storage container, wherein the sensing electrodes correspond to different liquid levels;
scanning capacitance values of the sensing electrodes by a liquid level determining circuit; and
determining a liquid level of a liquid in the liquid storage container based on the current capacitance values of the sensing electrodes,
wherein the liquid level determining circuit stores a plurality of base capacitance values and a plurality of capacitance thresholds corresponding to the sensing electrodes, and the step of determining the liquid level of the liquid in the liquid storage container based on the current capacitance values of the sensing electrodes comprises:
calculating capacitance variation values of the sensing electrodes based on the current capacitance values and the base capacitance values;
comparing the capacitance variation values of the sensing electrodes with the corresponding capacitance thresholds;
when the capacitance variation value of each of the sensing electrodes is greater than the corresponding one of the capacitance thresholds, indicating that the liquid level of the liquid is greater than or equal to the liquid level corresponding to each of the sensing electrodes; and
when the capacitance variation value of each of the sensing electrodes is less than the corresponding one of the capacitance thresholds, indicating that the liquid level of the liquid is lower than the liquid level corresponding to each of the sensing electrodes,
wherein the base capacitance values are lockup after a factory calibration is performed.

6. The method for sensing the liquid level according to claim 5, further comprising:
stopping the scanning operation after the operation of comparing the capacitance variation values of the sensing electrodes with the corresponding capacitance thresholds is completed during a scan period.

7. The method for sensing the liquid level according to claim 6, wherein the capacitance variation values of the sensing electrodes are compared with the corresponding capacitance thresholds from low to high liquid levels during the scan period.

8. The method for sensing the liquid level according to claim 6, wherein the capacitance variation values of the sensing electrodes are compared with the corresponding capacitance thresholds from high to low liquid levels during the scan period.

* * * * *